United States Patent
Collins et al.

(10) Patent No.: US 8,485,662 B2
(45) Date of Patent: Jul. 16, 2013

(54) CONTROL OF MYOPIA USING CONTACT LENSES

(75) Inventors: Michael Collins, Queensland (AU); Tobias Buehren, Stadtroda (DE); Leo Carney, Queensland (AU); Brett Davis, Queensland (AU); D. Robert Iskander, Queensland (AU); Ross Franklin, Jacksonville, FL (US); Stephanie Buehren, Stadtroda (DE)

(73) Assignee: Queensland University of Technology, Brisbane, Queensland (AU)

( * ) Notice: Subject to any disclaimer, the term of this patent is extended or adjusted under 35 U.S.C. 154(b) by 963 days.

(21) Appl. No.: 11/884,425

(22) PCT Filed: Feb. 14, 2006

(86) PCT No.: PCT/AU2006/000199
§ 371 (c)(1),
(2), (4) Date: Jun. 30, 2008

(87) PCT Pub. No.: WO2006/086839
PCT Pub. Date: Aug. 24, 2006

(65) Prior Publication Data
US 2009/0141235 A1   Jun. 4, 2009

(30) Foreign Application Priority Data
Feb. 15, 2005 (AU) .................... 2005900694

(51) Int. Cl.
*G02C 7/04* (2006.01)
(52) U.S. Cl.
USPC ............ 351/159.18; 351/159.19; 351/159.36; 351/159.79

(58) Field of Classification Search
USPC ................ 351/160 R, 160 H, 161, 162, 177, 351/159.18, 159.19, 159.36, 159.79
See application file for complete search history.

(56) References Cited

U.S. PATENT DOCUMENTS 3,468,602 A  9/1969 Rosen
3,973,837 A  8/1976 Page (Continued)

FOREIGN PATENT DOCUMENTS

CN  1243967  9/2000
DE  3514746  10/1986

(Continued)

OTHER PUBLICATIONS

European Search Report; Mar. 12, 2009.

(Continued)

*Primary Examiner* — Scott J Sugarman
(74) *Attorney, Agent, or Firm* — Howard & Howard Attorneys PLLC

(57) ABSTRACT

Devices and methods for controlling myopia are provided. The devices and methods relate to the inventors discovery of the relationship between near work, the forces applied to the eye by the eyelids and myopia. The devices include a contact lens comprising a region that disperses force applied to the eye by an eyelid. The devices also include a device designed by measuring first wavefront aberrations of an eye before pre-near work and measuring second measured wavefront aberrations of the eye post-near work. The methods include a method for controlling myopia including identifying optical changes associated with near work and correcting the optical changes with an optical device.

35 Claims, 4 Drawing Sheets

U.S. PATENT DOCUMENTS

| | | | |
|---|---|---|---|
| 4,157,864 A | | 6/1979 | Koller et al. |
| 4,702,573 A | | 10/1987 | Morstad |
| 4,890,911 A | | 1/1990 | Sulc et al. |
| 4,952,045 A | | 8/1990 | Stoyan |
| 5,100,225 A | * | 3/1992 | Rothe ............... 351/160 H |
| 5,166,710 A | | 11/1992 | Hofer et al. |
| 5,764,339 A | | 6/1998 | Horton |
| 5,929,968 A | | 7/1999 | Cotie et al. |
| 5,963,297 A | | 10/1999 | Reim |
| 5,971,542 A | * | 10/1999 | Volker et al. ............ 351/161 |
| 6,045,578 A | | 4/2000 | Collins et al. |
| 6,547,391 B2 | | 4/2003 | Ross et al. |
| 2002/0101563 A1 | | 8/2002 | Miyamura et al. |
| 2003/0058404 A1 | | 3/2003 | Thorn et al. |
| 2004/0021824 A1 | | 2/2004 | Ye et al. |
| 2004/0085510 A1 | | 5/2004 | Obrien |
| 2005/0254004 A1 | * | 11/2005 | Back ............... 351/160 R |

FOREIGN PATENT DOCUMENTS

| | | |
|---|---|---|
| EP | 1496388 A | 1/2005 |
| WO | WO0014593 | 3/2000 |
| WO | WO0175509 | 10/2001 |
| WO | WO2004097502 | 11/2004 |

OTHER PUBLICATIONS

Chinese Office Action; Mar. 13, 2009.

Buehren T. et al. "Corneal Aberrations and Reading". Optometry and Vision Science; 2003; 80:159-66.

Buehren T. et al. "Near Work Induced Wavefront Aberrations in Myopia". Vision research; 2005; 45:1297-312.

Kinge B. et al., "The Influence of Near Work on Development of Myopia Among University Students"; (Feb. 2000).

Collins, M.J. et al., Regression of Lid-Induced Corneal Topography Changes after reading. Optometry and Vision Science; 2005; 82:9; 842-49.

Read, S.A. et al., The Diurnal Variation of Corneal Topography and Aberrations. Cornea; 2005; 24:678-87.

Swarbrick H.A. et al., Corneal Response to Orthokeratology. Optometry and Vision Science; 1998; 75:791-9.

Choo J.D., et al., Morphologic Changes in Cat Epithelium Following Overnight Lens Wear with the Paragon CRT Lens for Corneal Reshaping. Investigative Ophthalmology and Visual Science; 2004; 45: E-abstract 1552.

Hague S., et al., Corneal and Epithelial Thickness Changes After 4 Weeks of Overnight Corneal Refractive Therapy Lens Wear, Measured With Optical Coherence Tomography. Eye and Contact Lens; 2004; 30:189-93.

Collins M.J., Buehren T.F., Lovergrove D., Brimelow T., Pham S., Toalster N. (2003), Reading Corneal Topography and Contact Lenses Invest Opthamol Vis Sci: 44:E-abstract 4781.

Wei Han, William Kwan, Jing Wang, Shea Ping Yip, Maurice Yap (2007), Influence of Eyelid Position on Wavefront Aberrations Ophthalmis Physiol Opt: 27 (1):66-75.

Shaw A.J., Collins M.J., Davis B., Carney L.G. (2008) Eyelid pressure: Inferences from corneal topography changes, poster No. 1026/D882 presented at the Association for Research in Vision and Ophthalmology (ARVO) 2008 Annual—Meeting, Apr. 27-May 1 2008, Fort Lauderdale, Florida.

Read S.A., Collins M.J., and Carney, L.G. (2007) The Influence of Eyelid Morphology on Normal Corneal Shape, Investigative Ophthalmology & Visual Science (IOVS): 48(1):pp. 112-119.

Jones, et al.; "Surface treatment, wetting and modulus of silicone hydrogels"; The Optician; Sep. 1, 2006; pp. 28-34; vol. 232, No. 6067.

Du Toit, et al.; "A Comparison of Three Different Scales for Rating Contact Lens Handling"; Optometry and Vision Science; May 2002; pp. 313-320; vol. 79, No. 5.

Stevenson, Ronald W.W.; "Young's Modulus Measurements of Gas Permeable Contact Lens Materials"; pp. 142-145; vol. 68, No. 2, (1991).

\* cited by examiner

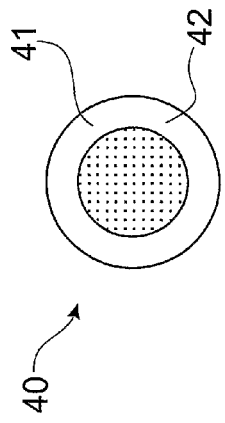
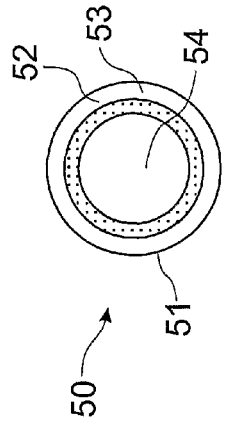
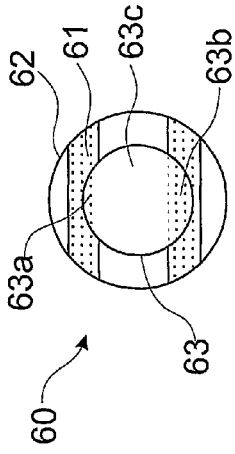
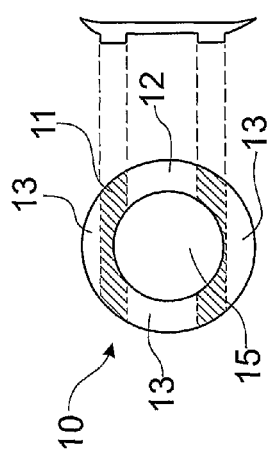
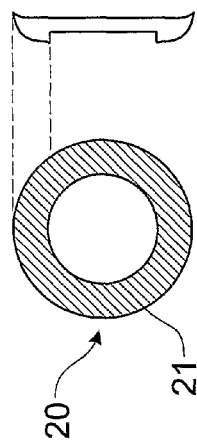
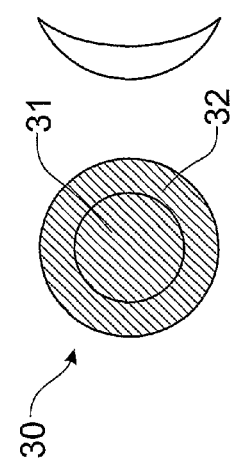

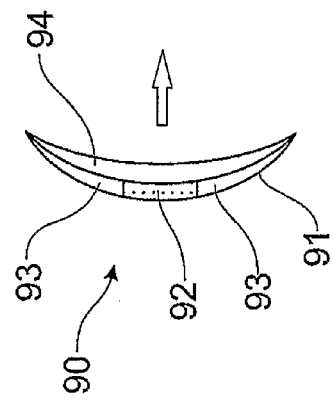
FIG. 7
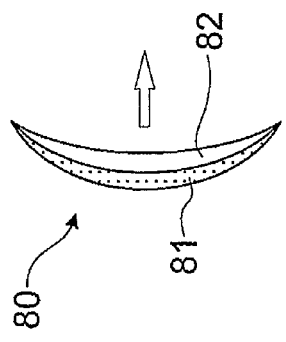
FIG. 8
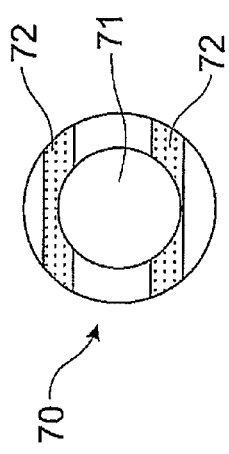
FIG. 9
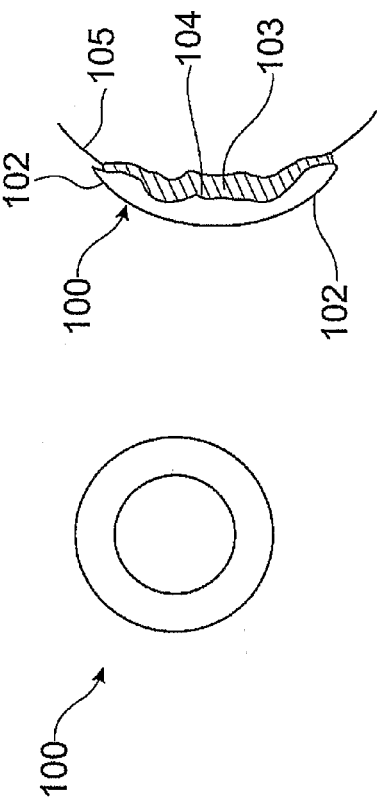
FIG. 10
FIG. 10a

CONTROL OF MYOPIA USING CONTACT LENSES

RELATED APPLICATIONS

This application claims priority to and all the advantages of International Patent Application No. PCT/AU2006/000199, filed on Feb. 14, 2006, which claims priority to Australia Application No. 2005900694, filed on Feb. 15, 2005.

FIELD OF THE INVENTION

The present invention relates to methods and optical devices for the control of Myopia. In particular, but not exclusively, the present invention relates to optical methods and optical devices to control myopia associated with near work and down gaze.

BACKGROUND TO THE INVENTION

Myopia is a visual defect in which distant objects appear blurred because their images are focused in front of the retina rather than on it. The term myopia encompasses all forms of myopia including, but not limited to, axial myopia, refractive myopia, myopic astigmatism and simple myopia. Myopia is also known as nearsightedness or short sightedness. Some myopia is associated with astigmatism which is often the result of an unequal curvature of the cornea of the eye which prevents light rays from focusing clearly at one or more points in the retina resulting in blurred vision. Myopia is a common visual disorder. Myopic progression is the deterioration of the myopic condition, so that a person becomes more short sighted. Myopia, and myopic progression, are associated with a greater risk of myopic retinal degeneration, glaucoma, and retinal detachment. Further, in developed countries myopia is currently the fifth most common cause of registered blindness.

Increased risk factors for myopia include myopic parents, the amount of near work, early visual deprivation and ethnicity; with Asians having significantly higher rates of myopia than Caucasians. Optical correction, such as eyeglasses, contact lenses, and refractive surgery for myopia is a major health care expense.

The development of myopia is often characterised as being of either axial or refractive origin. In axial myopia, the eye grows too long so the distance between the front surface of the cornea and the retina is too long compared to the optical refractive power of the eye. This elongation typically occurs in the vitreous chamber depth which is the distance between the back surface of the crystalline lens and the retina. In the less common refractive myopia the optical power of the eye, primarily the refractive power of the cornea and crystalline lens, are too strong compared to the axial length of the eye.

Astigmatism generally results from the cornea growing asymmetrically to produce corneal astigmatism, although it can also arise through the optical characteristics of the crystalline lens.

The control of eye growth may therefore occur through a range of mechanisms including axial length of the eye, corneal refractive power or the refractive power of the crystalline lens inside the eye. Failure of the mechanisms which are thought to regulate natural axial growth of the eye and the refractive power of the optical components of the eye may therefore result in the common refractive errors, such as, simple myopia, simple hyperopia, myopic astigmatism, hyperopic astigmatism and mixed astigmatism.

Previous attempts at myopia control have included spectacles, pharmacological methods, and contact lenses. The spectacle based therapies have included bifocals, near Rx (near prescription lenses), and progressive lenses.

The pharmacological approaches for myopia control have included atropine and pirenzepine. Atropine is a drug which paralyses accommodation and has been shown to slow myopia progression, however it is not a practical treatment. Pirenzepine, a selective M1-muscarinic antagonist has been shown to reduce myopic progression over a one-year period, however, subsequent results suggest that the effects of pirenzepine are limited.

Spectacle based approaches for myopia control also have disadvantages as some people prefer to wear contact lenses as they believe they are more attractive without spectacles, or do not want to be encumbered by spectacles or have better peripheral vision with contact lenses. Additionally, contact lenses are preferable for many active endeavors such as sports.

The contact lens based approaches for myopia control have been confined to rigid or hard lenses and orthokeratology. Orthokeratology is the use of contact lenses to temporarily reshape the cornea of the eye with the goal of achieving sharper vision.

A number of studies have been conducted into hard contact lenses and myopic progression, however while the results show some evidence for hard contact lenses slowing myopic progression, the results are inconclusive. Regardless, hard contact lenses are sometimes uncomfortable for the wearer, which for the comparatively sensitive eye, results in non-compliance.

U.S. Pat. No. 6,045,578 identifies a potential method of eye growth control based on a particular optical aberration of the eye, spherical aberration, U.S. Pat. No. 6,045,578 discloses how the presence of negative spherical aberration could promote eye growth and shows how correcting the negative spherical aberration of the eye could therefore slow or arrest eye growth. U.S. Pat. No. 6,045,578 does not address specific causes of myopia or myopia development associated with downward gaze and near work. Accordingly there is a need for a method and device which addresses these specific causes of myopia.

In this specification, the terms "comprises", "comprising" or similar terms are intended to mean a non-exclusive inclusion, such that a method, system or apparatus that comprises a list of elements does not include those elements solely, but may well include other elements not listed.

OBJECT OF THE INVENTION

It is an object of the present invention to address or at least ameliorate one or more of the aforementioned problems associated with the prior art or to provide a useful commercial alternative. Accordingly, it is another object of the present invention to provide a method and device to control eye characteristics, such as eye growth, associated with myopia and near work.

SUMMARY OF THE INVENTION

One aspect of the invention, although it need not be the only or indeed the broadest form, resides in a contact lens comprising a central lens and an outer region wherein the outer region comprises a thickened region that disperses force applied to an eye by an eyelid.

In one form the thickened region comprises a horizontal band.

Another aspect of the invention resides in a contact lens comprising a central lens and an outer region wherein the central lens comprises a region of high modulus that disperses force applied by an eyelid.

A further aspect of the invention resides in a contact lens comprising a central lens and an outer region wherein the outer region comprises a region of high modulus that disperses force applied by an eyelid.

A still further aspect of the invention resides in a contact lens comprising an outer surface region and an inner surface region wherein the outer surface region comprises a region of high modulus that disperses force applied by an eyelid.

Yet a further aspect of the invention resides in a contact lens comprising an Open-cell material that disperses force applied to an eye by an eyelid.

Another aspect of the invention resides in a method for controlling myopia including identifying optical changes associated with near work and correcting the optical changes with an optical device.

A further aspect of the invention resides in an optical device designed by measuring first wavefront aberrations of an eye before pre-near work and measuring second measured wavefront aberrations of the eye post-near work.

A still further aspect of the invention resides in a contact lens designed by measuring forces applied to an eye by an eyelid and based on the measured forces designing a contact lens that disperses force applied to the eye by an eyelid.

BRIEF DESCRIPTION OF THE DRAWINGS

By way of example only, preferred embodiments of the invention will be described more fully hereinafter with reference to the accompanying table and drawings, wherein:

TABLE 1 is a table showing the relative effects on corneal optics of three one hour tasks (reading, microscopy, and computer work);

FIG. 1 is a schematic diagram of a first embodiment of the invention;

FIG 1a is a perspective diagram of a first embodiment of the invention;

FIG. 2 is a schematic diagram of a second embodiment of the invention;

FIG. 2a is a perspective diagram of a second embodiment of the invention;

FIG. 3 is a schematic diagram of a third embodiment of the invention;

FIG. 3a is a perspective diagram of a third embodiment of the invention;

FIG. 4 is a schematic diagram of a fourth embodiment of the invention;

FIG. 5 is a schematic diagram of a fifth embodiment of the invention;

FIG. 6 is a schematic diagram of a sixth embodiment of the invention;

FIG. 7 is a schematic diagram of a seventh embodiment of the invention;

FIG. 8 is a schematic diagram of an eighth embodiment of the invention;

FIG. 9 is a schematic diagram of a ninth embodiment of the invention;

FIG. 10 is a schematic diagram of a tenth embodiment of the invention;

FIG. 10a is a perspective diagram of a tenth embodiment of the invention;

DETAILED DESCRIPTION OF THE INVENTION

Figure 11:
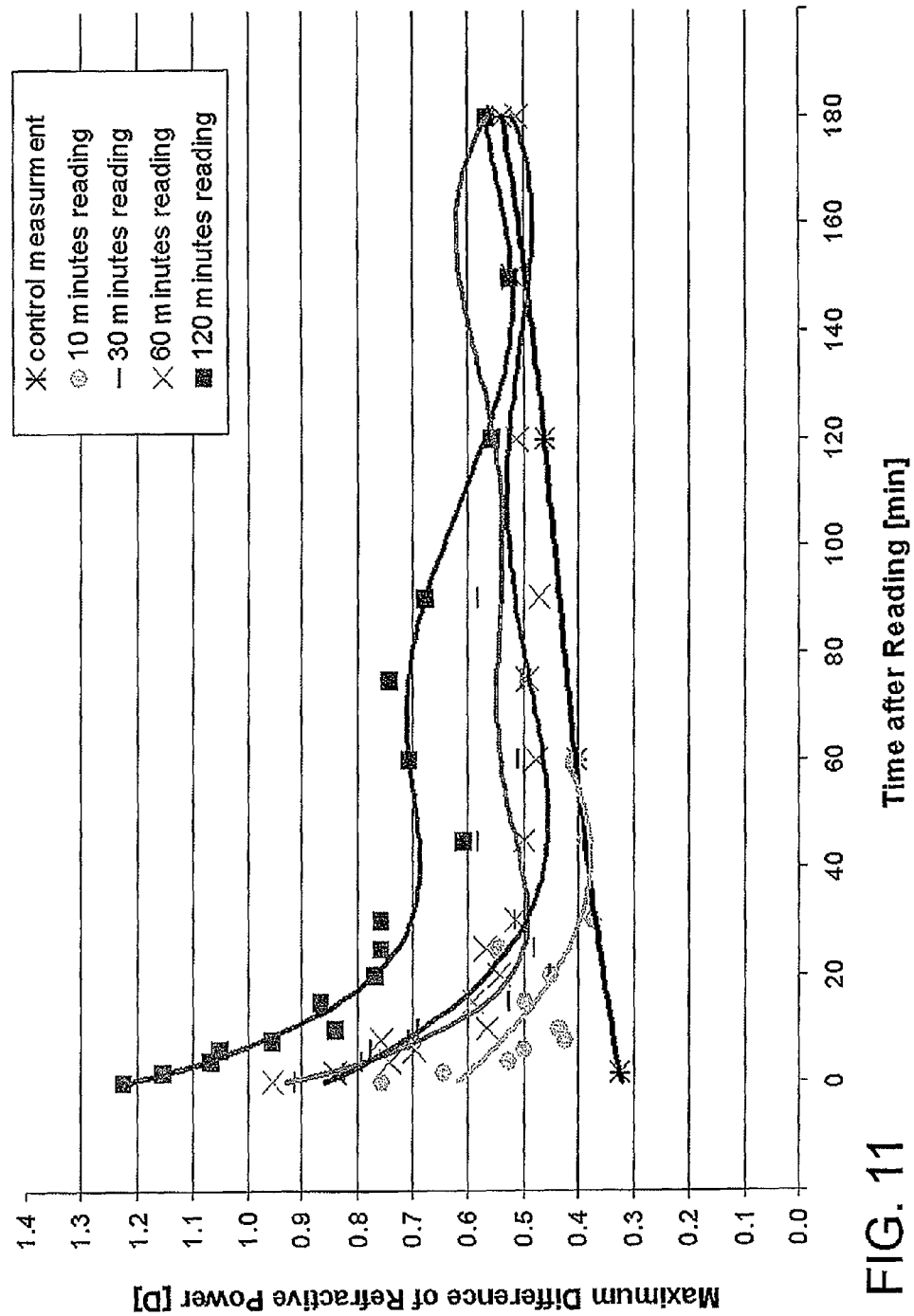
FIG. 11 is a graph showing regression of corneal refractive power changes following four reading trials.

The inventors have identified novel optical and novel mechanical methods for controlling eye growth. As mentioned above, myopia is generally a result of the eye growing too long. Controlling eye growth includes any aspect of control, such as inhibiting eye growth, promoting eye growth, manipulating eye growth and regulating eye growth.

The eyelids, upper and lower, apply forces on the eye and on the components of the eye. Through diligent study the inventors have discovered that the forces applied on the eye by the eyelids are associated with myopia and myopic progression.

The present inventors have undertaken studies of this novel cause of myopia and myopic progression and have ascertained novel methods for controlling myopia comprising identifying the optical changes associated with near work and correcting these changes with an optical device.

Control of myopia, as used in this specification, includes both curative treatment and palliative treatment. Therefore, the methods of treating myopia encompass preventing myopia onset and controlling and preventing myopic progression.

Correcting the optical changes associated with near work includes correcting, adjusting, altering inhibiting and reversing the optical changes.

The inventors have also undertaken studies of the novel cause of myopia to ascertain novel methods of controlling myopia associated with near work of an eye comprising dispersing forces applied by an eyelid to the eye so that the forces are no longer applied to the eye. The association between force applied to the eye by the eyelids, near work and myopia is shown Table 1, FIG. 11 and FIG. 12 which are discussed in detail in the examples below.

Dispersing eyelid forces, as used in this specification, encompasses both absorbing and redirecting the forces applied to the eye by at least one of the upper and lower eyelids. Dispersing of eyelid forces includes dispersing the forces that would otherwise be applied by at least one of the upper and lower eyelids to an eye to within the contact lens whereby the forces are absorbed by the contact lens. Dispersion of eyelid forces also includes the redistribution of forces that would otherwise be applied by at least one of the upper and lower eyelids to the eye to an object that is not the eye and to an area of the eye that does not influence myopia.

Many material properties may be exploited to disperse eyelid forces, including but not limited to, thickness, modulus, elastomeric properties, pneumatic properties and hydraulic properties.

Dispersing forces applied to the eye by the upper and lower eyelids may be achieved by globally thickening the lens, or by thickening the lens in one or more defined regions. An alternative to lens thickening is to alter the modulus of the lens material, again regionally or globally or in one or more defined regions. The modulus of the lens material is altered to a higher or lower value.

The contact lenses utilized in the present invention may be customized contact lenses designed based on the unique low and high order aberrations of each individual eye. Conventional contact lenses correct low order aberrations (myopia, hyperopia and astigmatism), whereas customized contact lenses also correct high order aberrations including optical characteristics such as coma, spherical aberration and trefoil.

Preferably, the forces applied to the eye by the upper and/or lower eyelid are dispersed so that the optical characteristics of the eye are unchanged by downward gaze or near work.

The optical characteristics of the eye include the characteristics of the eye itself, including but not limited to, low order aberrations (such as those arising commonly from myopia, hyperopia and astigmatism) and high order aberrations such as coma, spherical aberration and trefoil. The optical characteristics of the eye also include the characteristics of the eye's component parts. The eye's component parts include, but are not limited to, the cornea, lens, pupil, iris, retina and eyeball.

It is understood that the optical characteristics most likely to be targeted for control of myopia are characteristics of the high order aberrations of the eye (such as coma, spherical aberration and trefoil). However characteristics of low order components such as defocus and astigmatism may also be altered to control myopia progression.

Near work of the eye is any work done by the eye with regard to visualizing objects or text near to the eye, including but not limited to, reading of written or printed text such as the text of books, electronic or computerized books (e-books), computer monitors (including desktop and laptop/notebook computer monitors), other electronic screens, newspapers, magazines or reading from any other object on which text is displayed, and tasks involving downward gaze such as microscopy.

Some near work requires the eye to be in downward gaze. In this specification and the Claims appended hereto, downward gaze and down gaze are used synonymously, and refer to any position adopted by the eye that is below directly ahead, i.e. down gaze is any position below straight ahead gaze. Straight ahead gaze is also known as primary gaze.

Near to the eye means 1-100 cm from the object or text to the eye.

It will be appreciated by a person of skill in the art that near work includes down gaze near work. Down gaze near work is any near work in which the eye is in down gaze. There are a plethora of readily identifiable tasks that require down gaze near work. For example, one non-limiting example of down gaze near work is reading a book while seated in a chair. The conventional posture adopted by a person reading a book while seated in a chair requires the person to perform near work in a down gaze.

During down gaze near work, such as reading a book, the edge of the eyelids (i.e. lid margins) are typically located 2-4 mm from the centre of the pupil, with the upper eyelid margin typically closer to the centre of the pupil than the lower eyelid margin. The edge of the eyelids may be as little as 0.5 mm or as much as 10 mm from the centre of the pupil. The farther the eye looks downward, the closer the lower eyelid comes to the centre of the pupil compared with the upper eyelid.

Generally, prior art contact lenses comprise a central lens with a diameter of 7-9 mm diameter. The central lens of conventional contact lenses contains front and back surface curvatures which combine to create the optical power of the lens (after accounting for lens thickness and refractive index of the lens material).

The term contact lens refers to the entire product that is placed onto the eyeball. In addition to the central lens, contact lenses also conventionally comprise an outer region. The outer region is located between the edge of the central lens and the edge of the contact lens. Conventionally, the outer region of a contact lens is designed to provide a comfortable fitting of the lens to the eye, and causes minimal physiological disruption to the normal functioning of the eye.

Contact lenses also have an outer surface region, which is exposed to the environment, and an inner surface region which makes contact with the eye.

The central lens of the contact lens cannot have regional changes in thickness without affecting the contact lenses optical properties. In practice, this restricts regions of increased thickness for dispersing eyelid forces to the outer region of the contact lens. The outer region may be subdivided into two or more sub-regions of differing properties, such as thickness or modulus.

The region of increased thickness in the contact lens may be comprised of materials including, but not limited to, hydrogel polymers (e.g. hydroxyethylmethacrylate), silicone hydrogel polymers, rigid gas permeable polymers (e.g. silicon-acrylates, or fluoro-silicon-acrylates) and hard lens polymers (e.g. polymethylmethacrylate), or a combination thereof. The figures show a number of embodiments of lenses with thickened regions to reduce lid pressure in the central zone of the lens.

FIG. 1 shows a first embodiment of the invention, in which a contact lens 10 comprises horizontal bands 11 (11a and 11b). The external region 12 of the contact lens 10 comprises subregions of conventional thickness 13 and subregions comprising horizontal bands 11 of increased thickness. A person of skill in the art understands that the terms region and sub-region are used for reasons of clarity and the subregion be a region. The structure of the first embodiment is seen most clearly in the side view of FIG. 1a. The horizontal bands 11 are located on the lens at positions corresponding to the approximate position of the upper and lower eyelids on the contact lens 10 during near work.

In the first embodiment of the invention the regions of increased thickness are horizontal bands 11 corresponding approximately to the position of the eyelids in downward gaze, or the likely position of eyelids in down gaze. The desired position of the horizontal bands 11 is about 2-4 mm from the centre of the pupil when the contact lens 10 is being worn, but may be 0.5 to 5 mm, or any value therebetween, from the centre of the pupil when the contact lens 10 is being worn. For example, the position of a horizontal band 11 maybe 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, or 5.0 mm from the centre of the pupil when the contact lens is being worn.

In a variation of the first embodiment only one horizontal band 11 is present. The one horizontal band 11 may be either an upper horizontal band 11a or a lower horizontal band 11b. The upper horizontal bad 11a is located at a position corresponding to the approximate position of the upper eyelid during near work. The lower horizontal band 11b is located at a position corresponding to the approximate position of the lower eyelid during near work.

The likely position of the upper and lower eyelids down gaze may be attained by measuring the positions of a person's eyelids while they adopt a down gaze, by measuring the anatomy of the eye in relation to the face, by consulting published values, or by a combination of these methods.

The horizontal bands 11 preferably have a thickness ranging from 50 to 500 microns but may range from 10 to 1000 microns, and any value therebetween, depending upon the modulus of the material used For example, the thickness of a horizontal band 11 may be 100, 150, 200, 250, 300, 350, 400, 450, 500, 550, 600, 650, 700, 750, 800, 850, 900, 950 and 1000 microns.

Conventional contact lenses range in thickness from 50 to 500 microns thickness.

According to the first embodiment of the invention, and as depicted in FIG. 1, the horizontal bands 11 in the external region 12 do not extend into the central lens 15 of the contact lens 10.

The eyelids are sensitive to rapid curvature changes on the contact lens surface, therefore there are practical limitations to the amount of thickening that is likely to be tolerable for the wearer. To provide a globally thickened lens to disperse eyelid forces the thickness of e contact lens should be 100 to 1000 microns, or any value therebetween, depending upon the modulus of the material used. For example, the thickness of a globally thickened contact lens may be 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975 or 1000 microns.

The contact lenses of the invention may also include features constructed so as the contact lens does not rotate when on the eye. The inclusion of these positioning features helps to retain the regions of increased thickness in the correct position to absorb lid forces. These positioning features are designed to stop rotation of the contact lens by using thickened zones like a ramp. The ramp zones are in roughly the same locations as the regions of increased thickness to absorb lid forces. In the conventional contact lens designs, called soft toric lenses, the eyelid squeezes against the ramp zone with each blink and keeps the lens from freely rotating.

Contacts lenses of the invention may incorporate ramp zones or other design features of conventional contact lenses to minimize rotation of the contact lens.

As discussed above, comfort of the lens is important for wearer compliance. Some people may find horizontal bands of increased thickness on a contact lens uncomfortable as the wearer's eyelids move over the horizontal bands with each natural blink. A second embodiment of the invention is to make the whole annular peripheral zone of the lens thicker than usual to absorb eyelid force.

FIG. 2 shows a second embodiment of the invention in which the entire outer region 21 of a contact lens 20 is thicker than in conventional contact lenses. Designing the contact lens to have an increased thickness throughout the entire outer region 21 has the benefit of minimizing the thickness variations that the eyelid passes across during natural blinking. The structure is seen most clearly in the side view of shown in FIG. 2a which clearly depicts the size differential between the outer region 21 and the inner region 22.

In all transitions from thicker regions to thinner regions discussed herein it is understood that the transition may be in any gradient from 1-90°. A person of skill in the art readily understands that from a viewpoint of comfort, gradients from one region to another, or from one subregion to another, are made as smooth as possible.

Contact lenses in which the region of increased thickness is confined to the outer region should have a smooth transition curve from 0.1 to 1.0 mm wide. The transition curve is usually tangential to the curvatures on each side.

The thicker lens, and associated thicker lens edge may be uncomfortable for some people, a third embodiment is to make the entire contact lens thicker than conventional contact lenses. Making the entire contact lens thicker allows a less acute gradient to be used for lens thickness from outer edge to centre than permitted if the region of increased thickness is confined to the outer region of the contact lens.

The third embodiment is depicted in FIG. 3. FIG. 3 shows a contact lens 30 with an increased thickness globally. In this embodiment both the central lens 31 and the outer region 32 have an increased thickness. By making the contact lens thicker throughout, the optical problems associated with regional thickness in the central lens of the contact lens can be overcome. The profile of contact lens 30 is shown in FIG. 3a.

While the horizontal bands shown in the figures are all quadrilateral, it is understood than any shape designed to absorb and/or redistribute forces applied by the upper and/or lower eyelids to the eye may be used.

Additionally, while the horizontal bands shown in the figures show a stepped increase of 90°, the transition to the horizontal band maybe a graded increase of an angle from 1°-89° or a smooth curve of any mathematical description that provides a gradual transition between the two adjoining curvatures.

As mentioned above, another means of absorbing eyelid forces is to provide a contact lens comprising an altered modulus. The modulus of a material is measured in units of force per unit area divided by displacement per unit length. Qualitatively, this means that for a test piece of given dimensions and a given mode of deformation (e.g. bending), a material with a higher modulus will require a greater amount of force to achieve a given deformation (e.g. bending), or, by the same token, will deform (e.g. bend) less for a given application of force than a lower modulus material.

Unless stated otherwise, values stated herein for modulus are Young's rigidity modulus values in units of $kg/cm^2$. Materials used in conventional contact lenses have a Young's rigidity modulus in the ranges shown below:

Hydrogels (soft lenses) 3-20 $kg/cm^2$;
Silicone hydrogels 20-100 $kg/cm^2$;
Rigid gas permeable lenses 200-1000 $kg/cm^2$.

In other embodiments of the invention the modulus of the contact lens material is altered by increasing the modulus or cross-link density. The material of increased modulus may comprise prior art contact lens polymers and copolymers with increased crosslinking. Another option to increase the modulus of the contact lens materials is by using additives such as those added to prior art contact lens materials. Some common material monomers that increase modulus are silicone and methylmethacrylate.

High modulus contact lens materials for the outer region and two or more outer subregions preferably have a modulus of 20 to 1,000 $kg/cm^2$ or any value therebetween. For example high modulus contact lens materials for the outer region and two or more outer subregions may have a modulus of 20, 50, 100, 150, 200, 250, 300, 350, 400, 450, 500, 550, 600, 650, 700, 750, 800, 850, 900, 950 or 1000 $kg/cm^2$.

High modulus contact lens materials for the central lens preferably have a modulus of 20 to 1,000 $kg/cm^2$ or any value therebetween. For example high modulus contact lens materials for the central lens may have a modulus of 20, 50, 100, 150, 200, 250, 300, 350, 400, 450, 500, 550, 600, 650, 700, 750, 800, 850, 900, 950 or 1000 $kg/cm^2$.

The increase in the contact lens modulus can be a global increase, with the entire contact lens manufactured from high modulus materials.

Another option is to confine the increase in modulus to one or more distinct local areas of the contact lens, such as the central lens, the outer region or outer subregions, the outer (front) surface of the central lens or the entire outer surface region.

A soft lens which incorporates regions of material with high modulus may take a variety of forms. FIG. 4 depicts a fourth embodiment wherein the region of high modulus is in the central lens 41 of the contact lens 40. Contact lenses of this embodiment have a high modulus rigid central lens 41 surrounded by an outer region 42 of conventional soft lens material. The outer region of conventional soft lens material may be referred to as a skirt, or an annulus.

FIG. 5 depicts a fifth embodiment of the invention in which the outer region 51 of the contact lens 50 comprises two subregions. The outer region 51 contains a first subregion 52, the first subregion 52 surrounding the exterior of a second subregion 53. The first subregion 52 comprises a conventional modulus, and the second subregion 53 comprises a high modulus. The second subregion 53 surrounds a central lens 54 of conventional modulus. With respect to the central lens 54 of the contact lens 50, the first subregion 52, a conventional modulus peripheral annulus, lies external to the second subregion 53, an annulus of high modulus material, while the soft central lens 54 lies internal to the second subregion 53.

FIG. 6 depicts a sixth embodiment of the invention in which regions of increased modulus 61 run through both the external region 62 and the central lens 63 of the contact lens 60. The external region 62 comprises contact lens material of conventional modulus and horizontal bands 61 of high modulus. The central lens 63 comprises upper 63a and lower 63b subregions of high modulus and a central region 63c of conventional modulus.

The designation upper and lower is made with respect to position in the eye. The upper subregion is closer to the upper eyelid when the contact lens is positioned for use on the eye and the lower subregion is closer to the lower eyelid when the contact lens is positioned for use on the eye.

For accurate optical correction, it is understood that the refractive index of the high modulus central lens subregions 63a, 63b should be identical or very close to the conventional modulus central lens 63c subregions. If the refractive index of the two materials is different the shape and/or thickness of the central lens 63 maybe altered to produce an appropriate optical correction. Altering the shape and/or thickness of the central lens 63 in this manner requires stabilization of the lens, so that the contact lens does not rotate during blinking. If the contact lens rotates during blinking the optical alignment of the central lens to the eye would be altered.

The contact lens maybe stabilized against rotation during blinking by adding stabilization zones to the contact lens design as is the common practice in the design of soft toric contact lenses. These stabilization zones are areas of greater lens thickness that interact with the squeeze forces generated by the eyelids during each blink to stabilize the leas in approximately the correct orientation.

FIG. 7 depicts a seventh embodiment of the invention. FIG. 7 shows a contact lens 70 in which the region of high modulus is confined to outer region subregions comprising horizontal bands 72. As shown in FIG. 7 according to the seventh embodiment the horizontal bands 72 do not extend into the central lens 71, and the central lens of the contact lens has a conventional modulus.

FIG. 8 depicts an eighth embodiment of the invention. FIG. 8 shows a contact lens 80 in which the contact lens outer surface region and inner surface region have different modulus values. In the eighth embodiment, shown in FIG. 8, the outer surface region 81 has a high modulus and the contact lens inner surface region 82 (against the cornea when the contact lens 80 is positioned on the eye) has a lower modulus.

FIG. 9 depicts a ninth embodiment of the invention FIG. 9 shows a contact lens 90 in which the outer surface region 91 has a first central subregion 92 of high modulus in the central lens region 92 only, while the outer subregion 93 of the outer surface region 91 and the bulk of the lens and inner surface region 94 (against the cornea) have a lower modulus.

A lens material of higher modulus is one choice for absorption or redistribution of the forces exerted by the eyelids, however there are other material properties aside from modulus that can act to disperse the forces applied to the eye by the eyelids. For example, open-cell foam materials, for example open-cell foam materials, are useful for absorbing force.

To disperse the force applied to the eye by the eyelids contact lenses comprising non-high modulus force dispersing materials may have one or more of elastomeric, pneumatic and hydraulic properties.

These elastomeric, pneumatic, hydraulic or combination materials may be employed in embodiments such as those depicted in FIGS. 1, 2, 5, 6, 7, and 8, and 9.

Examples of these non-high modulus force dispersing materials include open-cell polymers, which have open-cells or pockets designed to fill, or be filled, with a gas, a gel or a fluid. The open cells are fully enclosed by the polymer material and are not exposed to the external environment. In one embodiment the fluid is the wearer's tears.

If these materials are not the same reactive index as the surrounding lens material, then they could either be restricted to the periphery of the lens, similar to as shown in FIG. 7, or optical correction may be performed using a different lens surface curvature in these regions.

FIG. 10 depicts a tenth embodiment of the invention, which uses a rigid contact lens 100 that vaults the underlying cornea 105, seen most clearly in FIG. 10a. By measuring the corneal topography, a lens may be designed for the wearer that contacts the underlying cornea near the periphery of the lens 102, but has a constant thickness space 103, that would fill with the wearer's tears, between the lens back surface 104 and cornea 105.

As discussed above, the present invention also provides optical methods for controlling myopia development by optical means comprising identifying the optical changes associated with near work or down gaze and correcting, altering or reversing these changes with an optical device. The optical correction required during near work is different to that required in normal viewing conditions. Therefore, vision may be limited in one of the conditions.

One embodiment of the optical method of the invention involves making a first measurement of wavefront aberrations of the eye before near work and a second measurement of wavefront aberrations of the eye after or during near work. In the first measurement the eye to be measured should be looking straight ahead (i.e. primary gaze) and have no accommodation demand (i.e. viewing a target at or near optical infinity). Then a second measurement of the wavefront aberrations of the eye is taken after or during a period of near work while the eye focuses on a near target (i.e. the eye is accommodating) in down gaze. The difference in wavefront aberrations between the normal condition (pre-near work) condition and the downward gaze condition (post-near work or during near work) may then be used to design an optical device.

Before near work means at least ten minutes has passed before the eye has performed a continuous period of new work of ten minutes or more. The length of time post-near work should be at least as long as the period spent doing near work. The near work maybe reading. For example, one hour of reading requires about one hour for the optical changes to go away.

The second measured wavefront aberrations may include a plurality of measurements, wherein at least one of the plurality of measurements is made during a period of down gaze near work and one of the plurality of measurements is made at the completion of the down gaze near work.

As the demands for near work and normal conditions are different, one embodiment requires two optical devices to be designed, a first optical device for normal conditions and a second optical device for near work.

Normal conditions are those that a person encounters when not primarily engaged in near work. Normal conditions may involve some near work, however near work is not the primary activity performed in normal conditions. If the wearer is going to be conducting near work for a sustained period, for example greater than fifteen minutes, the wearer should use the set of contact leases for the period of near work. Normal conditions is any condition in which near work is not the primary activity.

In another embodiment of the optical method of the invention one optical device is designed, the optical device being a weighted average of normal optical requirements and the optical requirements of near work.

In another embodiment of the optical method of the invention the one optical device designed is based on optical components from a conventional design and optical components from a myopia prevention design.

Optical components refers to components of an optical device utilized to alter vision and includes conventional optical components such as a central lens of a contact lens, and myopia prevention components such as those described herein.

In another embodiment the optical device designed is an intermediate design between normal optical requirements and the optical requirements of near work.

The optical device may be designed to correct, alter or reverse only a portion of or only some of characteristics of, the optical changes associated with down gaze and near work.

Another embodiment of the present invention is to identify the particular optical components, such as coma and trefoil, of the eye's optical characteristics that promote eye growth and then design an optical device to correct only this/these optical components or some percentage of them (between 0.0 and 100%). This could improve the optical performance of the optical device in both normal and near work conditions.

EXAMPLES

As mentioned earlier in the description experiments were conducted to examine the relationship between near work, eyelid pressure and myopia development. The experimental results shown in Table 1 show the relative effects on corneal optics of three near work tasks, reading, microscopy and computer work. Of these near work tasks reading and microscopy are known risk factors for myopia development whereas computer work is not associated with myopia development.

Figure 12:
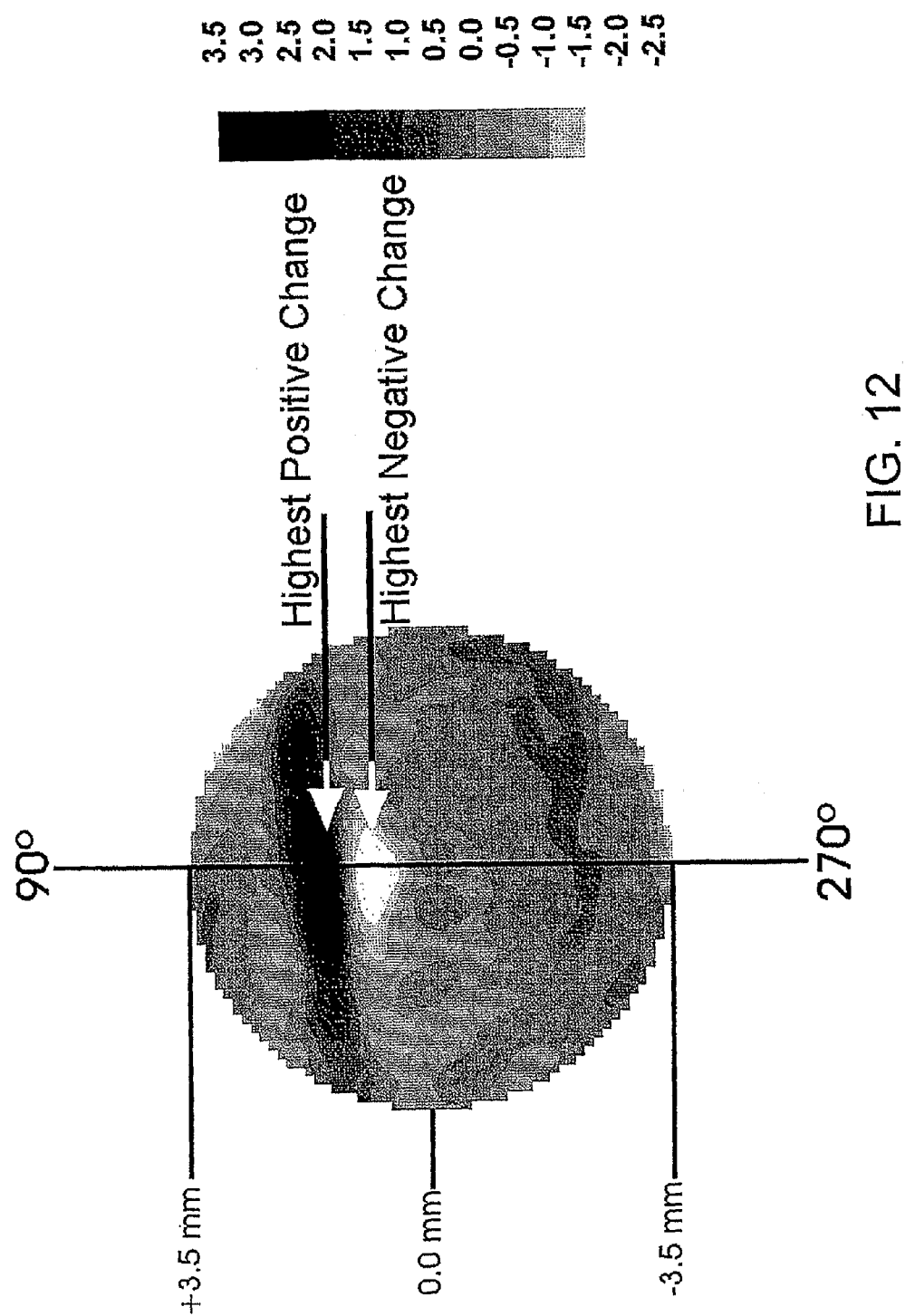
FIG. 12 is a corneal topography difference map graph showing the location of the highest change of power in the instantaneous power difference map along the 90 degree meridian of the cornea.

FIG. 11 and FIG. 12, further demonstrate the association between force applied to the eye by the eyelids, near work and myopia. FIG. 11 and FIG. 12 both appear in Collins et al., where the experimental protocols used to produce FIG. 11 and FIG. 12 are detailed (Collins M. J., Kloevekorn-Norgall K., Buehren T., Voetz S. C. and Lingelbach B., (2005), Regression of lid-induced corneal topography changes following reading, Optometry and Vision Science; 82(9): 843-849). These experimental protocols and the results and discussion detailed in Collins et al., are summarized below.

Materials & Methods

Six subjects, four females and two males, ranging in age from 21 to 28 years, with a mean age of 24 years, took part in the study. The right eye of each subject was used for measurements and five of the subjects were myopic and one was emmetropic. All subjects had best-corrected visual acuity of at least 0 logarithm of the minimum angle of resolution or better. A primary slit lamp examination was performed to ensure that all subjects had normal corneal characteristics and no anterior eye disease. All subjects had never worn rigid gas-permeable contact lenses. Soft contact lens wear were instructed to remove their contact lenses at least 3 days before the study.

The experiment comprised four reading sessions and one control session and was performed on five separate mornings (typically commencing between 8 and 9 AM). The subjects were asked not to perform any significant reading before the experiment began in the morning. The reading trials lasted 10 min, 30 min, 60 min, and 120 min and the order of testing was randomized between the subjects to avoid systematic bias. The subjects were seated in an office chair and asked to read a novel. The reading trials were intended to simulate a typical reading task and therefore subjects were encouraged to adopt a natural reading posture during the trial.

The Keratron videokeratoscope (Alliance Medical Marketing, Jacksonville, Fla.) was used for the corneal topography measurements. Six videokeratographs were taken at each measurement session. Baseline corneal topography data was measured before reading and again at 0, 2, 4, 6, 8, 10, 15, 20, 25, 30, 45, 60, 75, 90, 120, 150, and 180 min after reading. For the 10-min reading trial, measurements were taken up to 60 min postreading, because pilot studies had indicated that this was likely to be sufficient time for complete corneal recovery. Between the postreading measurement sessions, the subjects were asked not to perform any reading, writing, or to use a computer. As a control experiment, the subjects' corneas were measured on a separate morning at time intervals of 2, 60, 120, and 180 min after the first measurement was taken. Again, the subjects were asked not to read, write, or to use a computer before and between the measurement sessions.

Using a high-resolution digital camera, a photograph of each subject's eyelid position primary gaze was taken at the fist experimental session. The camera was mounted on a tripod and the subject's head was positioned in a headrest. A second photograph of the subject's eyelid position was taken while reading holding the digital camera between the subject and book. Eyelid position during reading was overlaid on the corneal topography and changes in topography compared with lid position. The methods for this analysis have been described previously (Buehren T., Collins M. J., Carney L., (2003), Corneal aberrations and reading, Optometry and Vion Science;80:159-66).

Each subject was asked to report subjective vision changes such as monocular diplopia associated with reading. Before and after every measurement session, the left eye was covered and the subjects were instructed to look at optotypes of 0.4 logarithm of the minimum angle of resolution size on a Bailey-Lovie test chart. The laboratory was darkened to mesopic levels to maximize natural pupil size and the test chart was illuminated. The examiner recorded the subject's description of vision quality.

Results

Corneal height, refractive power, and instantaneous power data were exported from the videokeratoscope for subsequent analysis. The six videokeratoscopes taken per measurement session were averaged according to a method outlined previously (Buehren T., Collins M. J., Carney L., (2003), Corneal aberrations and reading, Optometry and Vision Science,80: 159-66).

To investigate changes in the refractive and instantaneous power (before reading versus postreading), difference maps were calculated and significance maps (i.e., maps showing regional statistical significance of changes) were created for a 7-mm diameter (centered on the videokeratoscope axis). To analyze the changes in corneal (refractive and instantaneous) power after reading, a meridian analysis was performed in the 90° to 270° (vertical) meridian, because this meridian shows the greatest changes in topography associated with eyelid forces (Buehren T., Collins M. J., Carney L., (2003). Corneal aberrations and reading, Optometry and Vision Science;80: 159-66).

From FIG. 12, which shows the corneal topography difference map of a representative subject, the location of the highest change in power in the instantaneous power difference map can be seen. FIG. 12 shows changes in corneal topography primarily occurred in the superior half of the cornea and were correlated with upper eyelid position during reading. The highest positive change and negative change in instantaneous power were measured along the 90° meridian from the center of the map up to a distance 3.5 mm. The greatest change along the 90° to 270° meridian in each difference map was derived based on the highest positive or negative refractive power value.

Directly after reading, significant changes in refractive power were also found for all reading trial conditions (from 10 min up to 120 min reading) along the 90° meridian in the region up to 3.5 mm from the center of the map. The highest difference in local refractive power was found after 120 min reading with a group mean difference in power of 1.26 D (±0.44 D). After 60 min of reading, the difference was 0.96 D (±0.31 D), after 30 min it was 0.92 D (±0.28 D), and after 10 min it was 0.76 D (±0.42 D). By contrast, the control condition (no reading) showed a group mean refractive power difference along the 90° meridian of 0.32 D (±0.17 D). These natural variations in refractive power reflect common aberrations such as spherical aberration or vertical coma.

The regression in corneal refractive power changes after the reading and control trials are presented for the 90° meridian in FIG. 11. The graph in FIG. 11 shows regression of corneal refractive power changes in a representative subject following four reading trials (10 min, 30 min, 60 min and 120 min), the y axis is the maximum difference in refractive power along the 90 degree meridian, the control condition involved no substantial visual tasks. All reading trials (10 min up to 120 min) cause an increase in refractive power variation along the 90° corneal meridian. These changes show gradual regression to levels similar to the control condition, with longer reading trial conditions requiring longer regression times. A two-way repeated-measures ANOVA was performed on the difference of refractive power for the first 60 min after reading. It showed that the length of time spent reading had a significant effect on the magnitude of refractive power change (p=0.005), and that the time period after reading showed significant regression of refractive power changes (p<0.001). However, there was no significant interaction between the length of time spent reading and the regression of refractive power changes (p=0.24). This suggests that the rate of regression of power changes was independent of the length of time spent in prior reading.

The control condition (no reading) showed a slight but systematic increase in refractive power variation along the 90° throughout the 180-min observation period (FIG. 11). These findings, although surprising, are consistent with similar reported data (Read S. A., Collins M. J., Carney L. G., (2005), The diurnal variation of corneal topography and aberrations, Cornea; 24:678-87), in experiments which followed diurnal corneal topography changes over the course of 3 days.

Discussion

In reading gaze position, the eyelids cause changes in corneal topography that are related in magnitude to the length of time spent reading. That is, longer periods of continuous reading produced greater corneal topography changes. The regression of these topographic changes showed a similar pattern after different reading periods with a significant decline of changes within the first 10 min followed by a slower regression thereafter. After 10 min of reading, the corneal topography changes were largely gone within 10 min, whereas after 120 min of continuous reading, it took approximately 120 min for the topography changes to disappear. As a generalization, the amount of time for regression of the corneal changes to baseline levels required approximately the same amount of time as the person spent continuously reading.

The magnitude and location of the corneal topography changes we measured are consistent with those previously reported (Buehren T., Collins M. J., Carney L., (2003), Corneal aberrations and reading, Optometry and Vision Science; 80:159-66; and Buehren T., Collins M. J., Carney L., (2005) Near work induced wavefront aberrations in myopia, Vision Research; 45:1297-312). These topography changes closely follow the location of the eyelid margin during reading gaze. The localized increase and decrease of corneal radius in a horizontal band suggests that corneal reshaping is occurring as a result of the force of the eyelid margin. The process of orthokeratology may reflect a similar underlying mechanism of topographic change, but there is still no clear consensus on the exact anatomic nature of these changes (Swarbrick H. A., Wong G., O'Leary D. J. (1998), Corneal response to orthokeratology, Optometry and Vision Science;75:791-9; Choo J. D., Caroline P. J., Harlin D. D., Meyers W. (2004) Morphologic changes in cat epithelium following overnight lens wear with the Paragon CRT lens for corneal reshaping. Investigative Ophthalmology and Visual Science;45: E-abstract 1552; and Haque S., Fonn D., Simpson T., Jones L. (2004) Corneal and epithelial thickness changes after 4 weeks of overnight corneal refractive therapy lens wear, measured with optical coherence tomography, Eye and Contact Lena;30:189-93).

Because the topographic changes originate from the region of the cornea near the eyelid margin, it is possible that local changes in the tear film could also arise in this region of the ocular surface. However, it seems unlikely that any tear-related changes would persist in this region after a few natural blinks.

In summary, the amount of time spent in reading significantly influenced both the magnitude of corneal changes and the duration of recovery of the cornea to its prereading state. The topography of the cornea, and consequently the optical properties of the eye, is therefore sensitive to the prior reading tasks that have been undertaken.

The methods and devices of the present invention may also be embodied in any combination as systems.

Throughout this specification and the Claims appended hereto, it is understood that optical device includes all optical devices, including but not limited to, spectacles; monocles; soft contact lenses; rigid contact lenses; hybrid contact lenses comprising soft and hard contact lens materials; or any other lens designed in accordance with the present invention.

Throughout this specification the terms hard contact lens and rigid contact lens are used synonymously.

The methods and devices of the present invention thus provide solutions to the problem of myopia and myopic progression by virtue of acting on the detrimental effects of near work and down gaze.

The methods and devices of the invention have several advantages over and above the prior art. These advantages are readily apparent to a person of skill in the art upon reading the specification as filed. The advantages include, but are not limited to, identification of hitherto unrecognised causes of myopia and myopic progression, provision of novel methods and devices for prevention of myopia and/or controlling myopic progression.

Throughout the specification the aim has been to describe the invention without limiting the invention to any one embodiment or specific collection of features. Persons skilled in the relevant art may realize variations from the specific embodiments that will nonetheless fall within the scope of the invention.

TABLE 1

| Subject | RMGE 4 mm (D) Pre | RMGE 4 mm (D) Post | Changes in Corneal Best-Fit Spherocylinder (4 mm) Sphere | Changes in Corneal Best-Fit Spherocylinder (4 mm) Cylinder | Changes in Corneal Best-Fit Spherocylinder (4 mm) Axis | Hotelling T2 p-Value | Region(s) of Refractive Power Change (4 mm) p-Value |
|---|---|---|---|---|---|---|---|
| READING | | | | | | | |
| 1 | 0.26 | $0.48^b$ | +0.20 | −0.20 | 80 | <0.001 | <0.001 |
| 2 | 0.42 | $0.49^a$ | +0.20 | −0.17 | 64 | <0.05 | <0.001 |
| 3 | 0.27 | 0.26 | −0.10 | −0.02 | 179 | — | — |
| 4 | 0.32 | 0.31 | +0.00 | −0.13 | 35 | <0.001 | — |
| 5 | 0.47 | $0.55^a$ | +0.07 | −0.07 | 136 | — | <0.001 |
| 6 | 0.27 | 0.24 | +0.03 | −0.10 | 124 | — | — |
| 7 | 0.19 | 0.20 | −0.21 | −0.15 | 78 | <0.05 | <0.001 |
| 8 | 0.19 | $0.29^b$ | +0.13 | −0.22 | 127 | <0.001 | <0.001 |
| 9 | 0.22 | $0.41^b$ | +0.21 | −0.33 | 81 | <0.001 | <0.001 |
| AVE | 0.29 | 0.36 | +0.03 | −0.08 | 91 | — | |
| MICROSCOPY | | | | | | | |
| 1 | 0.31 | $0.50^b$ | +0.30 | −0.47 | 78 | <0.001 | <0.001 |
| 2 | 0.29 | $0.34^a$ | +0.23 | −0.13 | 78 | — | <0.001 |
| 3 | 0.21 | 0.22 | +0.34 | −0.07 | 54 | — | — |
| 4 | 0.23 | 0.22 | +0.10 | −0.08 | 119 | <0.05 | — |
| 5 | 0.42 | 0.45 | −0.07 | −0.15 | 46 | <0.05 | — |
| 6 | 0.25 | 0.26 | +0.00 | −0.24 | 109 | <0.001 | — |
| 7 | 0.22 | 0.22 | +0.38 | −0.24 | 83 | 0.001 | <0.001 |
| 8 | 0.25 | 0.23 | −0.02 | −0.18 | 2 | <0.001 | <0.001 |
| 9 | 0.23 | $0.37^b$ | +0.80 | −0.91 | 75 | <0.001 | <0.001 |
| AVE | 0.27 | 0.31 | 0.20 | −0.21 | 78 | — | |
| COMPUTER WORK | | | | | | | |
| 1 | 0.28 | $0.34^b$ | +0.08 | −0.18 | 163 | 0.001 | — |
| 2 | 0.42 | $0.36^b$ | −0.04 | −0.12 | 171 | <0.05 | — |
| 3 | 0.25 | 0.25 | +0.03 | −0.02 | 21 | — | — |
| 4 | 0.30 | 0.35 | +0.04 | −0.03 | 127 | — | — |
| 5 | 0.47 | 0.47 | +0.15 | −0.05 | 68 | — | — |
| 6 | 0.31 | $0.20^a$ | −0.17 | −0.14 | 177 | <0.05 | — |
| 7 | 0.20 | 0.19 | +0.07 | −0.06 | 69 | — | — |
| 8 | 0.28 | $0.31^a$ | +0.01 | −0.04 | 40 | — | — |
| 9 | 0.21 | 0.25 | +0.07 | −0.08 | 72 | — | — |
| AVE | 0.30 | 0.30 | 0.00 | −0.03 | 175 | — | |

The invention claimed is:

1. A contact lens comprising a central lens and an outer region wherein the outer region comprises one or more thickened horizontal band region located at a position corresponding to an eyelid with the eyelid positioned in down gaze that disperses force applied on an eye by the eyelid for controlling a progression of myopia in the eye.

2. The contact lens of claim 1 wherein the one or more thickened horizontal band region comprises a first horizontal band region located at a position corresponding to an upper eyelid and a second horizontal band region located at a position corresponding to a lower eyelid.

3. The contact lens according to claim 1 wherein transition to the thickened horizontal band region is gradual.

4. The contact lens according to claim 1 wherein the transition to the thickened horizontal band region is gradual.

5. The contact lens as set forth in claim 1 wherein the horizontal band region is quadrilateral.

6. The contact lens according to claim 1 comprising an open-cell material.

7. The contact lens according to claim 1 designed by measuring first wavefront aberrations of an eye before near work and measuring second wavefront aberrations of the eye after near work; and analyzing the first and second wavefront aberrations to thereby design the contact lens and apply the design to the contact lens wherein the design is selected from a group including:

a weighted average of the first measurement and the second measurement;

a design based on optical components from a conventional design based on the first measurement and optical components from a myopia prevention design based on the second measurement;

an intermediate design between normal optical requirements measured in the first measurement and optical requirements of near work measured in the second measurement; and an intermediate design between normal optical requirements measured in the first measurement and near work optical requirements measured in the second measurement.

8. The contact lens according to claim 6 wherein the open-cell material is filled with a gel.

9. The contact lens according to claim 6 wherein the open-cell material is filled 20 with a fluid.

10. The contact lens according to claim 9 wherein the fluid is a gas.

11. The contact lens according to claim 9 wherein the fluid is a wearer's tears.

12. The contact lens according to claim 1 wherein the one or more horizontal band region of high modulus is located a position wherein an upper or lower eyelid is positioned on the one or more thickened horizontal band region.

13. A contact lens comprising a central lens and an outer region wherein the outer region comprises one or more horizontal band region of high modulus that disperses force applied to an eye by an eyelid.

14. A contact lens of claim 13 wherein the one or more horizontal band region comprises a first horizontal band region located at a position corresponding to an upper eyelid and a second horizontal band region located at a position corresponding to a lower eyelid.

15. The contact lens of claim 13 wherein the outer region further comprise a region of conventional modulus.

16. A The contact lens as set forth in claim 13 wherein the horizontal band region is quadrilateral.

17. The contact lens according to claim 13 comprising an open-cell material.

18. The contact lens according to claim 13 designed by measuring first wavefront aberrations of an eye before near work and measuring second wavefront aberrations of the eye after near work; and analyzing the first and second wavefront aberrations to thereby design the contact lens and apply the design to the contact lens wherein the design is selected from a group including:
- a weighted average of the first measurement and the second measurement;
- a design based on optical components from a conventional design based on the first measurement and optical components from a myopia prevention design based on the second measurement;
- an intermediate design between normal optical requirements measured in the first measurement and optical requirements of near work measured in the second measurement; and
- an intermediate design between normal optical requirements measured in the first measurement and near work optical requirements measured in the second measurement.

19. The optical device of claim 17 wherein the open-cell material is filled with a gel.

20. The contact lens according to claim 17 wherein the open-cell material is filled with a fluid.

21. contact lens according to claim 20 wherein the fluid is a gas.

22. The contact lens according to claim 21 wherein the fluid is a wearer's tears.

23. The contact lens according to claim 13 wherein the one or more horizontal band region of high modulus is located a position wherein an upper or lower eyelid is positioned on the one or more thickened horizontal band region.

24. A contact lens comprising a central lens and an outer region, wherein the central lens and the outer region comprise one or more horizontal band region of high modulus that disperses force applied to an eye by an eyelid for controlling a progression of myopia in the eye.

25. The contact lens of claim 24 wherein the one or more horizontal band region comprises a first horizontal band region located at a position corresponding to an upper eyelid and a second horizontal band region located at a position corresponding to a lower eyelid.

26. The contact lens according to claim 24 wherein the horizontal band region is quadrilateral.

27. The contact lens according to claim 24 comprising an open-cell material.

28. The contact lens of claim 27 wherein the open-cell material is filled with a gel.

29. The contact lens of claim 27 wherein the open-cell material is filled with a fluid.

30. The contact lens of claim 29 wherein the fluid is a gas.

31. The contact lens of claim 29 wherein the fluid is a wearer's tears.

32. The contact lens according to claim 24 designed by measuring first wavefront aberrations of an eye before near work and measuring second wavefront aberrations of the eye after near work; and analyzing the first and second wavefront aberrations to thereby design the contact lens and apply the design to the contact lens wherein the design is selected from a group including:
- a weighted average of the first measurement and the second measurement;
- a design based on optical components from a conventional design based on the first measurement and optical components from a myopia prevention design based on the second measurement;
- an intermediate design between normal optical requirements measured in the first measurement and optical requirements of near work measured in the second measurement; and
- an intermediate design between normal optical requirements measured in the first measurement and near work optical requirements measured in the second measurement.

33. The contact lens according to claim 24 wherein the one or more horizontal band region of high modulus is located position wherein an upper or lower eyelid is positioned on the one or more thickened horizontal band region.

34. A contact lens for use with an eye, the eye including a pupil, an upper eyelid, and a lower eyelid, the contact lens comprising:
- a central lens; and
- an outer region extending outwardly from the central lens, wherein the outer region comprises at least one thickened horizontal band region, the at least one thickened horizontal band region including a first horizontal band region located at a position above a center of the pupil and corresponding to the upper eyelid with the eye positioned in a down gaze for dispersing force applied on the eye by the upper eyelid for controlling a progression of myopia in the eye.

35. The contact lens of claim 34 wherein the at least one thickened horizontal band region includes a second horizontal band region located at a position below the pupil center and corresponding to the lower eyelid with the eye positioned in the down gaze for dispersing force applied on the eye by the lower eyelid.

* * * * *

UNITED STATES PATENT AND TRADEMARK OFFICE
CERTIFICATE OF CORRECTION

PATENT NO. : 8,485,662 B2
APPLICATION NO. : 11/884425
DATED : July 16, 2013
INVENTOR(S) : Michael Collins et al.

It is certified that error appears in the above-identified patent and that said Letters Patent is hereby corrected as shown below:

In the Claims:

Column 16, in Claim 9, line 59: Delete the number "20" between the words filled and with.

Column 17, in Claim 16, line 12: Delete the "A" at the beginning of the sentence.

Column 17, in Claim 19, line 37: Delete the words "optical device" and replace with -- contact lens --.

Column 17, in Claim 21, line 41: Insert the word -- The -- at the beginning of the sentence.

Signed and Sealed this
Eighth Day of October, 2013

Teresa Stanek Rea
*Deputy Director of the United States Patent and Trademark Office*